Figure 1:
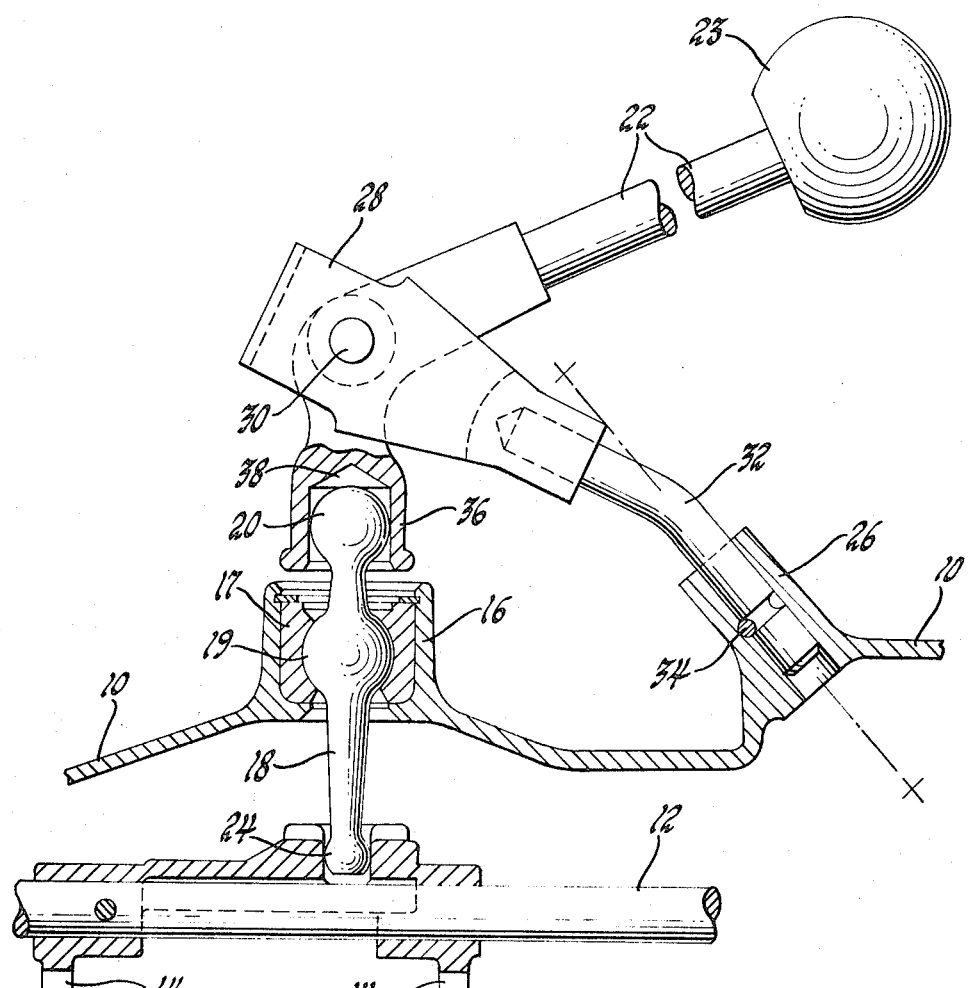

United States Patent [15] 3,656,365
Kussmann [45] Apr. 18, 1972

[54] GEARSHIFT CONTROL ARRANGEMENT

[72] Inventor: Lutz W. Kussmann, Russelsheim, Hesse, Germany

[73] Assignee: General Motors Corporation, Detroit, Mich.

[22] Filed: Nov. 19, 1970

[21] Appl. No.: 90,954

[30] Foreign Application Priority Data

Jan. 13, 1970 Germany .................. P 20 01 261.7

[52] U.S. Cl. .................................................. 74/473 P
[51] Int. Cl. .................................................. G05g 9/02
[58] Field of Search ............... 74/473 P, 473 R, 475, 476, 74/477

[56] References Cited

UNITED STATES PATENTS 2,694,943 11/1954 Brumbaugh ........................ 74/473

3,476,202 11/1969 Dudley ........................ 74/473 X

Primary Examiner—Milton Kaufman
Assistant Examiner—F. D. Shoemaker
Attorney—W. E. Finken, A. M. Heiter and J. P. Moran

[57] ABSTRACT

A manual shift arrangement including a gearshift lever pivotally mounted on a pin and having a cup-shaped lower extremity, a connector lever having spherical ends and an intermediate spherical portion universally pivotally mounted in a dome portion of a conventional gearbox, one spherical end extending from the gearbox into the cup-shaped extremity and the other spherical end extending into the gearbox for pivotal engagement with conventional shift forks, and a rotatably mounted bent rod member connected by a yoke to the shift lever adjacent the pin to provide transverse pivotal movement of the gearshift lever.

3 Claims, 2 Drawing Figures

INVENTOR.
Lutz W. Kussmann
BY
John P. Moran
ATTORNEY

GEARSHIFT CONTROL ARRANGEMENT

The invention relates to a shift arrangement for change-speed gears, particularly for motor vehicles, having shift elements moved by a gearshift lever.

In known arrangements, certain speed-groups are selected by a gearshift lever, while within the selected speed-group, the transmission ratios are changed in the gearbox by displacing sliding pinions. The known shift arrangements have exhibited the defect that the leverage ratio or advantage at the gearshift lever for selecting the speed-group and for operating the sliding pinions, is the same in both cases. In establishing the leverage ratio and the gearshift travel movements, the result was that the designer was compelled to adopt compromises. This consequently impeded the attainment of the most economical design of the gearbox and its dimensions, compatible with the gearshift convenience striven for.

The present invention provides the designer with means whereby it is possible to choose leverage ratios of differing magnitude for selecting a certain gear-speed group and for operating the sliding pinions. Consequently, it is possible to attain optimum design conditions for the gearbox dimensions, in addition to greater gearshift convenience.

According to the invention, this problem is solved by providing the shift arrangement with two hinge points, of which one is located in a yoke which, in turn, is pivotally mounted in a bearing firmly connected with the gearbox.

This fixing of the hinge points makes it possible to make the leverage ratio in the shift arrangement for the selection of the gear-speed group independent of the leverage ratio of the shift arrangement for the movement of the sliding pinions.

Appropriately, the hand lever provided for operating the gearshift is mounted in the yoke so as to be pivotable in the longitudinal direction of the vehicle, whereas for a movement transverse to the longitudinal axis of the vehicle it is movable about the bearing firmly connected to the gearbox.

Advantageously, the transmission-side extremity of the manual gearshift lever actuates one end of an intermediate lever which, in turn, is movably mounted in the dome of the gearbox cover and engages by its other end in the shift forks of the gear.

Figure 2:
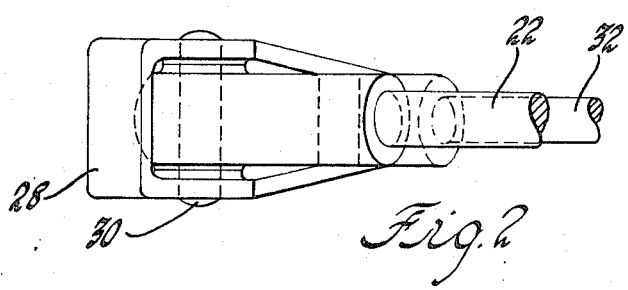

An embodiment of the invention is illustrated in the drawings, in which:

FIG. 1 is a side elevation of the gearshift system; and
FIG. 2 a plan on same.

In the drawings, 10 denotes the cover of a gearbox. Mounted in the gearbox are the selector rods 12 with the shift forks 14 for operating the sliding gears (not shown). The gearbox cover 10 is provided with a dome 16 in which an intermediate lever 18 with a spherical head 19 is mounted capable of swiveling universally in the usual manner in split bushes 17. The spherical end 20 of the intermediate lever 18 is engaged by the cup-shaped or bell-shaped extremity 36 of a gearshift lever 22. The transmission-side spherical end 24 of the intermediate lever 18 engages in the shift forks 14 which are arranged in the transmission for operating different gear-speed groups.

On the gearbox cover 10, at a certain distance from dome 16, there is provided a bearing 26 for mounting a pivotable yoke 28 in which the manual gearshift lever 22, cranked at an obtuse angle and provided with a knob 23, is mounted by means of a pin 30. As will be seen particularly from FIG. 2, the yoke 28 can be formed from a U-shaped bow member which is shrunk onto a round-section iron 32. This latter is mounted capable of rotary movement in bearing 26 and is secured in its longitudinal direction by a notched dowel pin 34. The cranked end of the manual gearshift lever 22 is provided with a bore 38 or a cup-shaped extremity 36 which accommodates the spherical end 20 of the intermediate lever 18, possibly with the interposition of split bushes similar to the bushes 17 in dome 16. These split bushes may consist of a suitable plastics material.

It will be readily apparent that with this construction of the gearbox, the manual gearshift lever 22 can be swiveled about the pin 30 in the plane of the drawing and in addition it can be swiveled about the axis X — X of bearing 26 due to its pivotal axis 30 being mounted in the yoke 28. During a movement of the manual gearshift lever 22 in the plane of the drawing about pin 30, the cup-shaped or bell-shaped extremity of this lever 22 moves in opposite direction. This movement is conveyed to the intermediate lever 18 in such a way that its transmission-side end 24 in the gearbox is moved in the plane of the drawing in the same sense as the manual gearshift lever 22 or its knob 23. The leverage ratio of these movements depends, inter alia, on the position of pin 30 with respect to the upper end 20 of the intermediate lever 18.

On the other hand, a movement of the manual gearshift lever 22 at right angles to the plane of the drawing brings about a swiveling of yoke 28 about the axis X — X of bearing 26, while at the same time the cranked extremity 36 of the gearshift lever 22 likewise moves at right angles to the plane of the drawing. The result is that the intermediate lever 18 is, in turn, swiveled about the mid-point of the spherical bearing 19 at right angles to the plane of the drawing and its bottom end 24, moving in the same direction as the manual gearshift lever 22, is brought into engagement with the next gear-speed group. As will readily be apparent, the magnitude of this movement is determined by the choice of the distance between the spherical end 20 of the intermediate lever 18 and the axis X — X of bearing 26.

By providing appropriate stops (not shown), it is possible in the usual manner, to limit the movements of the end 24 of the intermediate lever 18, both during the selection of the gear-speed group as well as during the shifting of the gears. Then the invention permits an appropriate design for the gearshift plan, having regard to the travel of the gearshift lever knob 23 in both directions.

I claim:

1. A manual shift mechanism for use with a gearbox including shift elements, said mechanism comprising a pivotally mounted gearshift lever having a cup-shaped lower extremity, an intermediate lever having spherical ends and an intermediate spherical portion formed thereon, said intermediate spherical portion being universally pivotally mounted in a portion of said gearbox, one of said spherical ends being pivotally mounted in said cup-shaped lower extremity of said gearshift lever and the other of said spherical ends being pivotally connected to said shift elements, and a bent rod member rotatably mounted in a fixed position at one end thereof and operatively connected at the other end thereof to said gearshift lever adjacent said cup-shaped lower extremity.

2. A manual shift mechanism comprising a gearbox, at least one shift fork in said gearbox, a dome portion formed on said gearbox, a lever member having spherical ends and an intermediate spherical portion formed thereon, said intermediate spherical portion being universally pivotally mounted in said dome portion, one of said spherical ends being pivotally connected to said shift forks, a gearshift lever, a cup-shaped end portion formed on said gearshift lever, a rod member rotatably mounted at one end thereof on said gearbox adjacent said dome portion, a yoke secured to the other end of said rod member, said rod member having an intermediate bent portion, and a pin member pivotally connecting said yoke to said gearshift lever adjacent said cup-shaped end portion.

3. A manual shift arrangement including a gearbox having at least one shift fork mounted therein, a connector lever having an intermediate spherical portion universally pivotally mounted in an opening formed in said gearbox, a first spherical end portion formed on the end of said lever within said gearbox for pivotal connection with said at least one shift fork, a bent rod member rotatably mounted at one end thereof on said gearbox, linkage means on the other end of said bent rod member, a gearshift lever, a second spherical end portion formed on the end of said lever extending from said opening for pivotal connection with one end of said gearshift lever, and a pin member connecting said linkage means with an intermediate portion of said gearshift lever and serving as a pivot means for pivoting said second spherical end portion of said connector lever in a predetermined direction about said intermediate spherical portion in response to a first manual movement of said gearshift lever, said bent rod member permitting said second spherical end portion to be pivoted in a direction transverse to said predetermined direction in response to a second manual movement of said gearshift lever.

* * * * *